(12) United States Patent
Schaible et al.

(10) Patent No.: US 7,911,149 B2
(45) Date of Patent: Mar. 22, 2011

(54) IMPEDANCE CONTROLLED ELECTRONIC LAMP CIRCUIT

(75) Inventors: Uwe D. Schaible, Ancaster (CA); Norman H. von Styp-Rekowski, Oakville (CA)

(73) Assignee: Marlex Engineering Inc., Ancaster (CA)

( * ) Notice: Subject to any disclaimer, the term of this patent is extended or adjusted under 35 U.S.C. 154(b) by 538 days.

(21) Appl. No.: 12/033,482

(22) Filed: Feb. 19, 2008

(65) Prior Publication Data

US 2008/0197786 A1 Aug. 21, 2008

Related U.S. Application Data

(60) Provisional application No. 60/890,567, filed on Feb. 19, 2007.

(51) Int. Cl.
*H05B 37/02* (2006.01)
(52) U.S. Cl. .......................... 315/224; 315/291; 315/307
(58) Field of Classification Search .............. 315/209 R, 315/224, 225, 244, 291, 307, 308, 318, 361; 363/21.07, 21.15, 902, 905
See application file for complete search history.

(56) References Cited

U.S. PATENT DOCUMENTS

| 4,952,849 | A | * | 8/1990 | Fellows et al. ................. 315/307 |
| 5,187,414 | A | * | 2/1993 | Fellows et al. ................. 315/307 |
| 5,949,197 | A | * | 9/1999 | Kastner .......................... 315/291 |
| 6,531,831 | B2 | * | 3/2003 | Chou et al. ..................... 315/225 |
| 6,860,628 | B2 | | 3/2005 | Robertson et al. |
| 7,114,830 | B2 | | 10/2006 | Robertson et al. |
| 7,352,138 | B2 | * | 4/2008 | Lys et al. ....................... 315/291 |
| 7,560,868 | B2 | * | 7/2009 | Yu et al. .......................... 315/94 |

* cited by examiner

*Primary Examiner* — Jacob Y Choi
*Assistant Examiner* — Jimmy T Vu
(74) *Attorney, Agent, or Firm* — Borden Ladner Gervais LLP; Jeffrey W. Wong (57) ABSTRACT

There is provided lamp ballast impedance controlled electronic lamp circuit, powered by a lamp ballast, for controlling a set of light emitting devices and being, comprising at least one connector, for connecting to the lamp ballast; and for receiving an AC signal; at least one filament control, associated with one of the at least one connector; a circuit for transforming the AC signal to a DC signal; a power convertor circuit; for receiving the DC signal and for processing the DC signal to provide a signal to power to the set of light emitting devices; a control and monitoring circuit; wherein the control and monitoring circuit monitors the DC signal and controls the impedance of either the at least one filament control or the power convertor circuit to control the set of light emitting devices.

18 Claims, 8 Drawing Sheets

IMPEDANCE CONTROLLED ELECTRONIC LAMP CIRCUIT

CROSS REFERENCE TO RELATED APPLICATION

This application claims the benefit of priority of U.S. Provisional Patent Application No. 60/890,567 filed Feb. 19, 2007, which is incorporated herein by reference in its entirety.

FIELD OF THE INVENTION

The present invention relates generally to electronic lamps and more specifically to a lamp ballast impedance controlled electronic lamp circuit for allowing a variety of electronic light emitting devices to be powered by a lamp ballast.

BACKGROUND OF THE INVENTION

A problem with conventional electronic lamps is that they often use an electronic circuit to regulate a constant current supplied to the light emitting devices (LEDs). This produces an incremental negative resistance as a load to the ballast they are connected to, however, a typical ballast cannot properly drive such a load. This condition causes a ballast to operate at some output level below its intended operating point or can cause a runaway condition that causes the ballast output voltage to increase to the point that can destroy the LED lamp components. Another problem with conventional electronic lamps is that they often use a transformer to match the ballast output voltage to the LED string voltage. This can be optimized to provide a load to the ballast that causes it to operate at its designed output level. However, the LED forward voltage changes due to operating temperature and aging effects. This change causes the optimized operating point to shift to a less efficient one because the effective load impedance the ballast sees changes. Another problem with conventional electronic lamps is that they often only connect to one electrode at both ends of the tube leaving one electrode at both ends of the tube unconnected. This can cause three problems when used with some ballasts.

First, it requires that the LED lamp be connected to an electrode in series with a capacitor. Such capacitors are typically in series with one of the two electrodes at either end of the tube in ballasts using voltage mode filament heating which results in a change in the load seen by the ballast and thus a shift in the operating point away from the optimum value. Second, in the case of rapid start ballasts that utilize current mode filament heating, the LED lamp is connected to an electrode which, in turn, is connected to a free floating capacitor inside the ballast, thereby providing no continuous electrical path in the lamp circuit and preventing the LED lamp from turning on. Third, modern electronic ballasts also have circuitry to detect broken lamp filaments or disconnected tubes by monitoring the filament resistance across these two terminals. An LED lamp that does not mimic the filament, when one electrode is completely disconnected, will cause these ballasts to shut down.

In these respects, the lamp ballast impedance controlled electronic lamp circuit according to the present invention substantially departs from the conventional concepts and designs of the prior art, and in so doing provides an apparatus primarily developed for the purpose of allowing a variety of electronic light emitting devices to be powered by a lamp ballast.

SUMMARY OF THE INVENTION

In view of the foregoing disadvantages inherent in known electronic lamps, the present invention provides a novel lamp ballast impedance controlled electronic lamp circuit wherein the circuit can be utilized for allowing a variety of electronic light emitting devices to be powered by a lamp ballast.

In an aspect of the invention, there is provided an impedance controlled electronic lamp circuit, powered by a power source, for controlling a set of light emitting devices and being, comprising at least one connector, for connecting to the power source; and for receiving a power signal; at least one filament control, associated with one of the at least one connector; a power convertor circuit; for receiving the power signal and for processing the power signal to provide a signal to power to the set of light emitting devices; and a control and monitoring circuit; wherein the control and monitoring circuit monitors the power signal and controls the impedance of either the at least one filament control or the power convertor circuit to control the set of light emitting devices.

A further aspect of the invention is to provide a lamp ballast impedance controlled electronic lamp circuit that controls the input impedance and power factor of a light emitting diode (LED) lamp in order to mimic the run-mode electrical characteristics of a real fluorescent tube and therefore have the ballast operate at its designed electrical operating point.

In yet another aspect, there is provided a lamp ballast impedance controlled electronic lamp circuit that separates the number and type of LEDs, or other light producing devices, used in the lamp and the input impedance control function.

In one further aspect, there is provided a lamp ballast impedance controlled electronic lamp circuit that automatically draws power through the correct pins of the fixture so as to avoid drawing current through any capacitors in any existing filament heating circuits in the ballast.

In yet a further aspect of the invention, there is provided a lamp ballast impedance controlled electronic lamp circuit that controls the filament impedance so as to allow lamp removal and end of life circuits in a ballast to operate properly and allow the ballast to be put into failure mode if required.

In another aspect, there is provided a lamp ballast impedance controlled electronic lamp circuit that automatically adjusts its operation so that temperature and aging effects of the LEDs, or other light producing devices, do not shift the electrical operating point of the ballast.

Other objects and advantages of the present invention will become obvious to the reader and it is intended that these objects and advantages are within the scope of the present invention.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
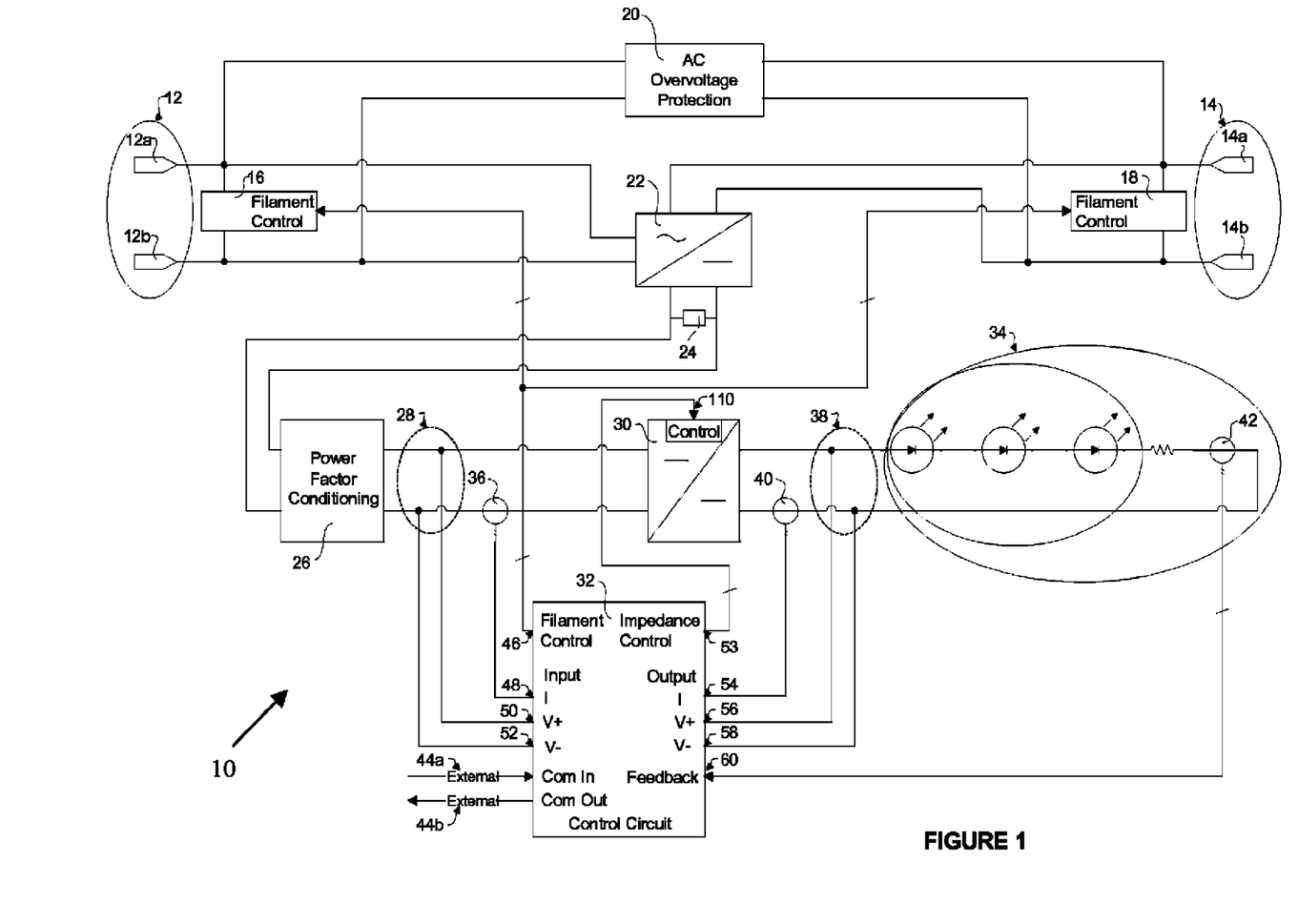
FIG. 1 is an electrical block diagram showing the main components of the present invention.

Turning to FIG. 1, a schematic diagram of an impedance controlled electronic lamp circuit is shown. In the preferred embodiment, the circuit 10 comprises a first, power source, or ballast connector 12 including a first, power source, or ballast connection 12a and a second, power source, or ballast connection 12b which form a two pin connector for connection to the ballast output of a first filament of the lamp and a second, power source, or ballast connector 14 including a first, power source, or ballast connection 14a and a second, power source, or ballast connection 14b which form a two pin connector for connection to the ballast output for a second filament of the lamp. The first ballast connector 12 and the second ballast connector 14 provide an apparatus or means to electrically connect the circuit 10 to form a connection between the circuit 10 to the lamp output. In one embodiment, this can be implemented via a suitable connector or a set of lead wires. In a preferred embodiment, the connectors 12 and 14 are of the same form as those found on the type of lamp normally used with the ballast. Furthermore, a single connector containing all ballast connections can also be used.

In an alternative embodiment, the connectors 12 and 14 can be connected directly to a line voltage source, such as 120V/230/240/277/347 VAC.

In the current embodiment, the circuit 10 further comprises a first filament simulation, or control circuit 16 and a second filament simulation, or control circuit 18 which mimics the impedance characteristics of the filaments in the lamp that the circuit 10 is intended to replace.

An AC overvoltage protection circuit 20 contains at least one electrical path from each of the first ballast connection 12a and second ballast connection 12b of the first ballast connector 12 to each of the first ballast connection 14a and second ballast connection 14b of the second ballast connector 14 with at least one overvoltage protection device in series with the electrical path (as will be described below). As will be understood, this component is optional but preferred.

The circuit 10 also includes a rectifier circuit 22 that includes a plurality of diodes, diode bridges, or other rectification devices, which are preferably connected as a four phase rectifier so that the most positive voltage of the first ballast connections 12a and 14a and second ballast connections 12b and 14b of the of the first ballast connector 12 and second ballast connector 14 appear on the positive side of a DC output end of the rectifier circuit 22 and the most negative voltage of the first ballast connections 12a and 14a and second ballast connections 12b and 14b of the of the first ballast connector 12 and second ballast connector 14 appear on the negative side of the DC output end of the rectifier circuit 22.

In the current embodiment, a DC overvoltage protection circuit 24 is located in the output path, or paths, of the rectifier circuit 22 and includes at least one electrical path from the positive side to the negative side of the DC output end of the rectifier circuit 22 with at least one overvoltage protection device in series with the electrical path (as will be discussed below). A power factor conditioning (PFC) circuit 26 also receives the output from the rectifier circuit 22 and comprises either an active or passive power factor correction circuit 26 to bring the input impedance of the electronic lamp, as seen by the ballast, to as close to a unity power factor as possible, thereby emulating the power factor of a real fluorescent tube. As will be understood, the PFC circuit 26 can comprise a peak valley fill power factor correction or a continuous current controlled power factor correction. In the absence of a PFC circuit 26, a set of connections 28 referring to the output end of the PFC circuit 26 are referred back to the rectified DC output end of the rectifier circuit 22.

A power converter 30, comprised of any number of DC to DC switching converter topologies, is connected to the output of the PFC circuit 26, as well as an impedance control signal from a control circuit 32. A requirement of the power converter 30 is that the input current at the DC bus input end be controllable through the control signals at the control input end and that the power converter 30 causes the voltage at the power converter circuit converter output end to rise until the power converter input power minus any losses in the power converter are transferred to a light emitting circuit 34.

Figure 5:
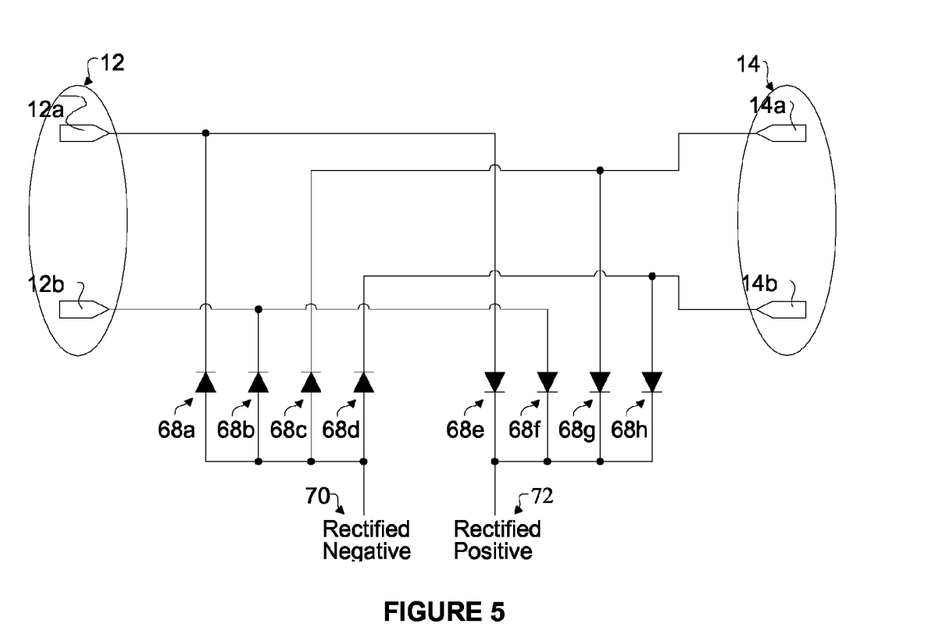
FIG. 5 is an electrical schematic of the rectifier circuit.
Figure 10:
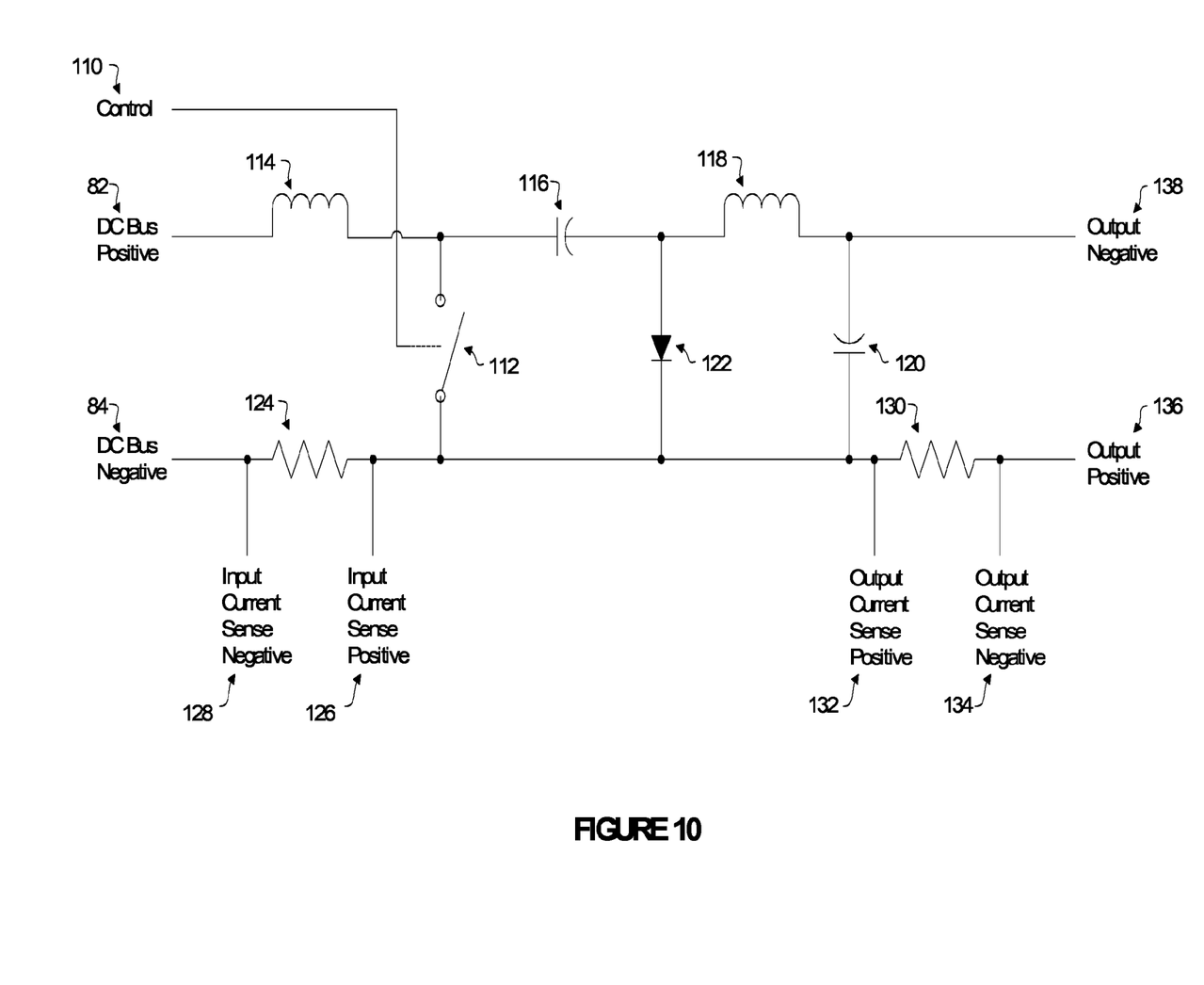
FIG. 10 is an electrical schematic of a Cuk topology DC to DC converter.

The power factor conditioning circuit is connected between the rectified DC positive 72 and the rectified DC negative 70 of the rectifier circuit 22 shown in FIG. 5 and between the DC bus positive 82 and the DC bus negative 84 of the power converter circuit 30 shown in FIG. 10.

The light emitting circuit 34 comprises a single string or parallel strings of multiple single light emitting devices or multiple light emitting devices in series. The light emitting devices can be any device that runs on a DC voltage such as light emitting diodes (LEDs). If parallel strings are used, a method of current sharing, such as a resistor in series with each string, can be used. Some form of current feedback, such as a current limiting resistor, can also be used to detect open strings due to damaged light emitting devices. The light emitting circuit preferably replaces a fluorescent lamp or a high Intensity Discharge (HID) lamp.

The control circuit 32 monitors the input voltage and current to the DC bus input end of the power converter circuit and produces a set of control signals to the power converter circuit that controls the input current based on the value of the input voltage such that the effective input impedance of the electronic lamp is controlled. The voltage and current signals on the power converter circuit output end are monitored for any fault conditions so that shutdown of the circuit can be performed in such an event. A feedback signal from each parallel string of light emitting devices in the light emitting circuit 34 is monitored through the feedback input end 42 and the effective input impedance can be controlled to reduce the power delivered to the remaining strings in the event of string failures. The control hardware can also monitor an external dimming input on the dimming input end and control the power converter circuit to change the effective input impedance of the electronic lamp to cause the ballast to deliver less power to the power converter and thus lower the power output to the light emitting circuit and reduce the light output. The control circuit 32 can be composed of many types of circuits known to those skilled in the art and include, but are not limited to, microcontrollers, digital signal processors, systems on a chip, hysteresis controllers, op-amp circuits, and discrete transistor circuits. The salient feature of the control circuit is not its construction but rather what it does.

One of the functions of the control circuit 32 is to monitor the DC bus voltage at the input to the power converter circuit 30 at connection 28 and the input current to the power converter circuit 30 through current sensor 36 and to manipulate the control input of the power converter circuit so that the DC bus voltage at connection 28 and the input current through current sensor 36 produce the desired input impedance. A second function of the control circuit 32 is to monitor the output voltage of the power converter circuit 30 at connection point 38 and current through current sensor 40 to detect over/under voltage and current conditions as well as other fault conditions and take appropriate actions. On a fault condition, the filament control output to the filament simulation circuits 16 and 18 can be used to simulate an open filament and shut down the ballast, or power supply. In other cases, the impedance control function can be used to change the input impedance to a level that causes the ballast to reduce or increase, as appropriate, its operating output power level. A third function of the control circuit 32 is to monitor the current through multiple strings of light emitting devices by way of their current sense outputs as symbolized in FIG. 1 by current sensor, feedback end, 42 which is connected to the feedback input of the control circuit 32. When a string of light emitting devices becomes defective this can be sensed and appropriate actions such as shutting down the ballast through the filament control output or reducing input power from the ballast through the impedance control output may be performed. A fourth function of the control circuit 32 is the monitoring of external devices for communications input 44a and act upon the information received. Information can include, but is not limited to, dimming information and functional commands. In the case of dimming information, appropriate manipulation of the impedance control to change the input impedance of the circuit so that the ballast will operate at the correct power level for the dimming setting. An off command can use the filament control output to place the ballast in a fault mode that turns off its output. The external device from which the information is received can be a variety of devices known to those skilled in the art and include, but are not limited to, RF receivers, IR receivers, 0-10V voltage inputs, 4-20 mA current loops, and switches. A fifth function of the control circuit 32 is to log and report back operation of the unit to external devices through communications output 44b. The external device to which the information is sent can be a variety of devices known to those skilled in the art and include, but are not limited to, RF transmitters, IR transmitters, 0-10V voltage outputs, 4-20 mA current loops, LED indicators, and LCD screens.

The control circuit 32 also includes a filament control output port 46, a power convertor input current port 48, a power convertor input V+ port 50, a power convertor input V− port 52, an impedance control port 53, a power convertor output current port 54, a power convertor output V+ port 56, a power convertor output V− port 58 and a feedback port 60.

Figure 2:
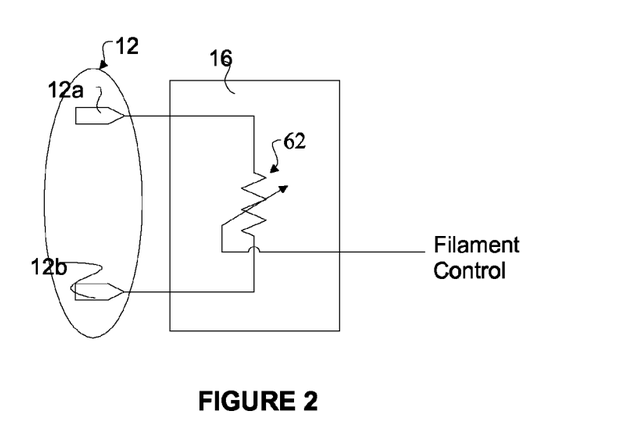
FIG. 2 is an electrical schematic of the filament simulation circuit.

Turning to FIG. 2, a more detailed diagram of the filament control 16 is shown. As will be understood, the second filament control 18 is identical to the filament control 16 shown. The filament control circuit 16 is connected between the first ballast connection 12a and second ballast connection 12b of the first ballast connector 12 to control the impedance between the two connections. A connection from the output of the filament control output port 46 of the control circuit 32 controls the impedance of an element 62. Element 62 is a symbolic representation of any number of possible impedance circuit configurations and components such as, but not limited to, digital potentiometers, fixed resistors, operational amplifier transconductance circuits, and transistor and MOSFET transconductance circuits.

Figure 3:
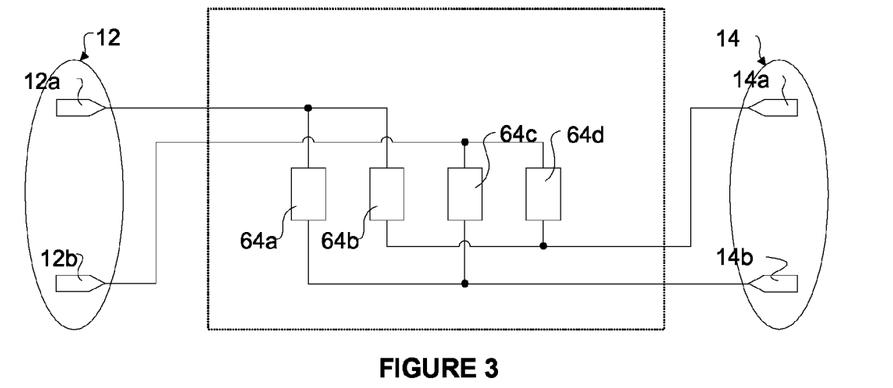
FIG. 3 is an electrical schematic of the AC overvoltage protection circuit.

Turning to FIG. 3, a more detailed schematic of the AC overvoltage protection circuit 20 is shown. Transient voltage suppression devices 64a and 64b are connected between the first ballast connection 12a of the first ballast connector 12 and the first ballast connection 14a and the second ballast connection 14b of the second ballast connector 14. Transient voltage suppression devices 64c and 64d are connected between the second ballast connection 12b of the first ballast connector 12 and the first ballast connection 14a and the second ballast connection 14b of the second ballast connector 14. The devices 64 protect against overvoltage conditions between pairs of ballast connections of the first ballast connector 12 and the second ballast connector 14. The transient voltage suppression devices 64 can be any of a number of such devices known to those skilled in the art and include, but are not limited to, transient voltage suppressors, gas discharge tubes, metal oxide varistors, sidactors, and zener diodes. Each transient voltage suppression device 64 can include multiple physical devices to provide enhanced protection characteristics and is well known to those skilled in the art.

Figure 4:
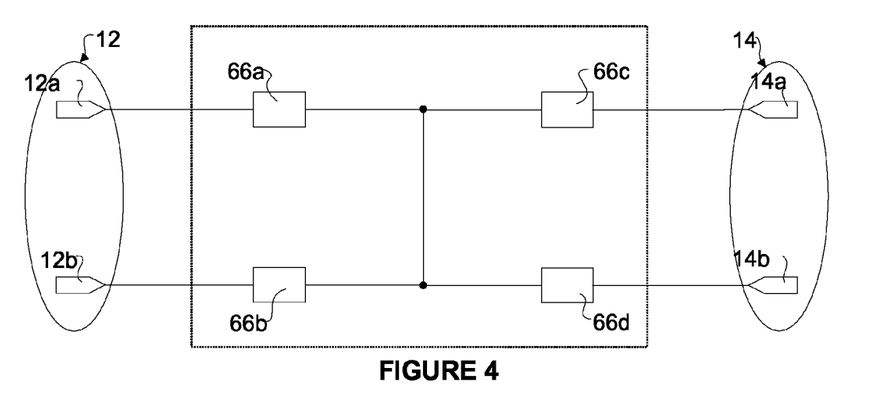
FIG. 4 is an alternative electrical schematic of the AC overvoltage protection circuit.

FIG. 4 shows an alternate configuration that provides the same protection as that in FIG. 3, except that two of the transient voltage suppression devices 66a, 66b, 66c, and 66d are activated to provide a path between ballast connections on ballast connector 12 and ballast connector 14. The transient voltage suppression devices 66 can comprise the same combination of physical devices as used for transient voltage suppression devices 64 with the only difference being that devices 66 need only to have one half of the voltage rating as the devices 64a, 64b 64c and 64d. Transient voltage protection devices in a circuit do not have to be physically identical and can each be comprised of different physical devices.

Turning to FIG. 5, a more detailed schematic of the rectifier circuit 22 is shown. The rectifier circuit 22 takes an AC voltage across ballast connector 12 and ballast connector 14 and produces a rectified DC output through the use of rectifier devices 68a, 68b, 68c, 68d, 68e, 68f, 68g, and 68h. As configured in FIG. 5, rectifier devices 68a, 68b, 68c, and 68d allow only the most negative electric potential present on the ballast connections 12a, 12b, 14a, and 14b to appear on the rectified DC negative side 70 while rectifier devices 68e, 68f, 68g, and 68h allow only the most positive electric potential present on the ballast connections 12a, 12b, 14a, and 14b to appear on the rectified DC positive side 72. In this way an AC signal between ballast connector 12 and ballast connector 14 is rectified into a DC signal. In other words, the connectors 12 and 14 are connected to an anode of a rectifier device connected to the rectified DC positive 72 and a cathode of a rectifier device connected to the rectified DC negative 70. As will be understood, if the input supplied tot the connectors 12 and 14 is a DC signal, there is no need to rectify the signal.

The rectifier devices 68 can be composed of many types of physical devices known in the art or combinations thereof. These include, but are not limited to, diodes, and tube rectifiers. Alternatively, a group of four (4) individual rectifier devices 68 can be replaced by a full bridge rectifier device.

With respect to the DC overvoltage circuit 24, transient voltage suppression devices are connected between the DC outputs 70 and 72 of the rectifier circuit 22. This protects against overvoltage conditions across the DC output of the rectifier circuit 22. The transient voltage suppression devices can be any of a number of such devices known to those skilled in the art and include, but are not limited to, transient voltage suppressors, gas discharge tubes, metal oxide varistors, sidactors, and zener diodes. The DC overvoltage protection circuit 24 can be composed of multiple physical devices to provide enhanced protection characteristics and is well known to those skilled in the art.

Figure 6:
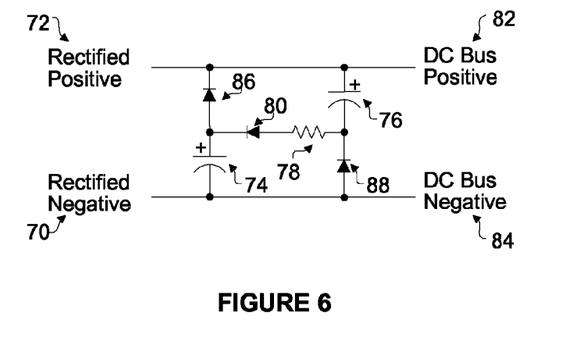
FIG. 6 is an electrical schematic of a peak valley fill circuit.
Figure 7:
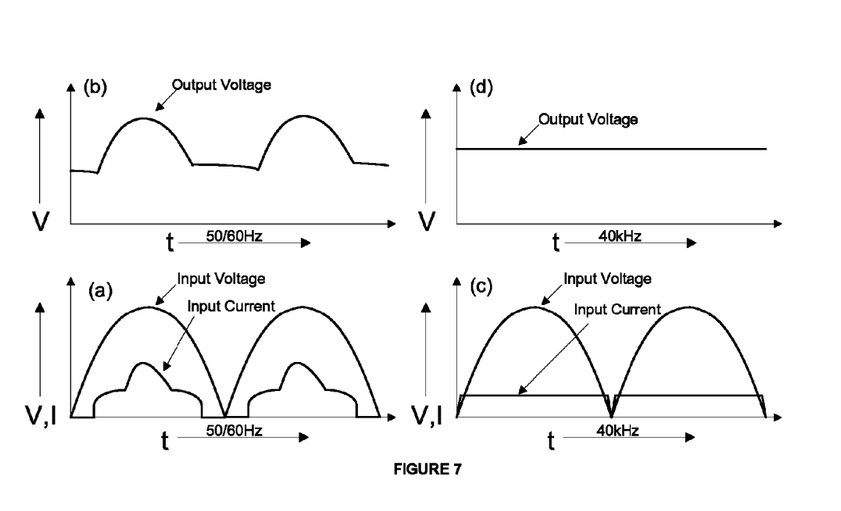
FIG. 7 is a set of graphs showing the operation of the peak valley fill circuit.

Turning to FIG. 6, a more detailed schematic of the PFC circuit 26 using passive components is shown. Capacitors 74 and 76 are employed as temporary energy storage devices that are charged from the rectified positive 72 and negative 70 outputs through resistor 78 and diode 80. The series capacitors are charged to the maximum peak input voltage between the rectified positive 72 and negative 70 outputs, thereby leaving a voltage of one half of the maximum peak input voltage across each capacitor 74 and 76. As the voltage between the rectified positive 72 and negative 70 begins to fall from its maximum peak value, the polarity of diode 80 ensures that the series combination of capacitors 74 and 76 cannot discharge through the DC Bus positive 82 and negative 84 outputs. The output voltage between the DC Bus positive 82 and negative 84 lines will equal the falling input voltage between the rectified positive 72 and negative 70 lines until a voltage level of slightly below one half of the maximum peak input voltage is reached. At that point, diodes 86 and 88 become forward biased and each of the capacitors 74 and 76 can then supply its stored energy through the DC Bus positive 82 and negative 84 lines. The output voltage between the DC Bus positive 82 and negative 84 lines will then fall at the rate of discharge of the now parallel capacitors 74 and 76. The energy to the DC bus positive 82 and negative 85 lines is supplied solely by the now parallel capacitors 74 and 76 until the input voltage between the rectified positive 72 and negative 70 lines again equals or exceeds the output voltage between the DC Bus positive 82 and negative 84 lines. Sizing of the capacitors 74 and 76 as well as the resistor 78 influence the shape of the input current. FIGS. 7a and 7b show the typical input voltage and current and the output voltage of the described passive component power factor conditioning circuit when the electronic lamp is powered from a 50 Hz or 60 Hz output lamp ballast and FIGS. 7c and 7d show the typical input voltage and current and the output voltage of the described passive component power factor conditioning circuit when the electronic lamp is powered from a 40 kHz output lamp ballast. In both cases, the power factor resulting from the input current and the input voltage to the power factor conditioning circuit will typically be greater than 0.94. The passive power factor conditioning circuit 26 can be composed of different arrangements and implementations of the components described.

Figure 8:
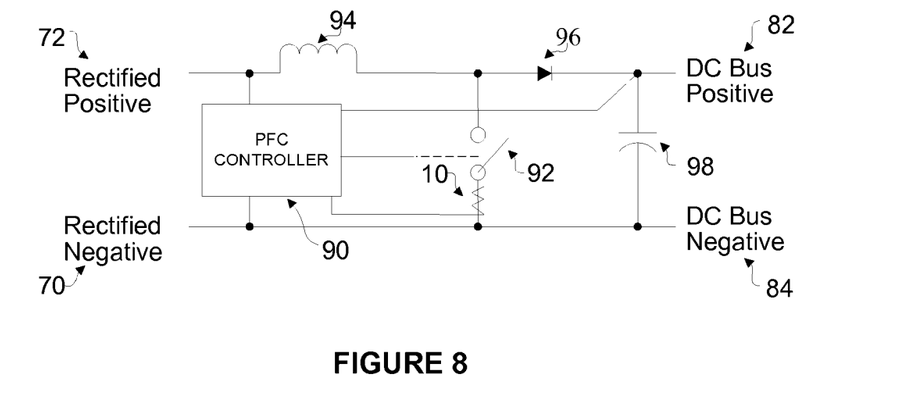
FIG. 8 is an electrical schematic of a continuous current controlled PFC circuit.
Figure 9:
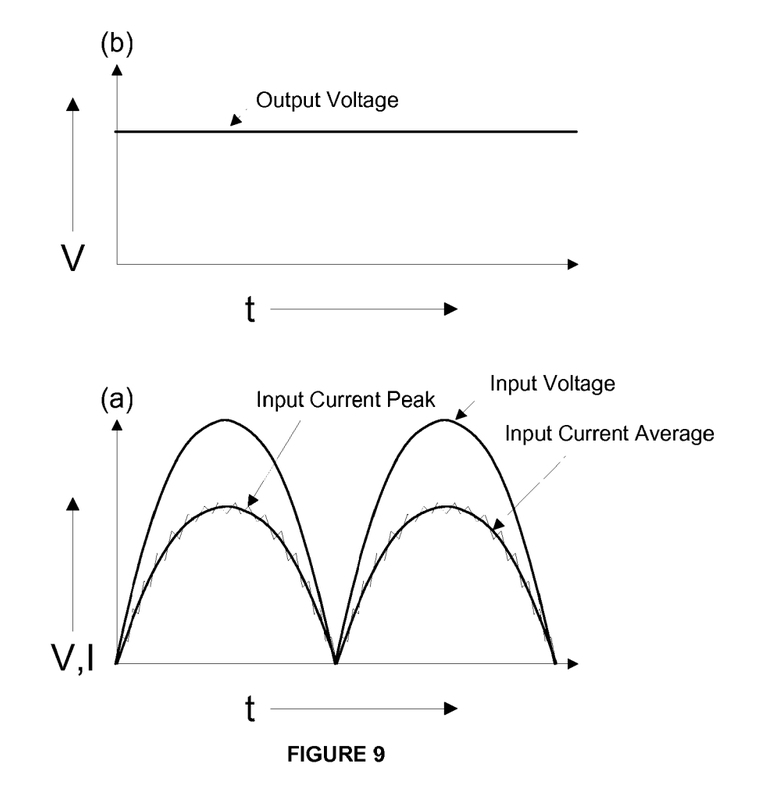
FIG. 9 is a set of graphs showing the operation of the continuous current controlled PFC circuit.

FIG. 8 shows an alternate implementation of the PFC circuit 26 using active components. A PFC controller 90 is utilized to actively modulate a switching device 92 alternating the electrical conducting path between Path 1: the rectified Positive 72, an inductor 94, the closed switching device 92 and the rectified Negative 70, and Path 2: the rectified Positive 72, the inductor 94, a diode 96, a DC Bus capacitor 98, and the rectified Negative 70. The switching device 92 can take the form of many physical devices well known in the art such as, but not limited to, BJTs, MOSFETs, and IGBTs. Feedback signals from the DC Bus Positive 82, a current sensing means 100, and the rectified Positive 72 are supplied to the PFC Controller 90, which in turn adjusts the frequency and/or duty cycle of the actively modulated switching device 92 so as to generate the desired rectified input current in relation to the rectified input voltage while maintaining the desired DC Bus output voltage. FIGS. 9a and 9b show the typical input voltage and current and the output voltage of the described active component power factor conditioning circuit. The power factor resulting from the input current and the input voltage to the power factor conditioning circuit is typically be greater than 0.99. The active power factor conditioning circuit 26 can be composed of different arrangements and implementations of the components described and is well known to those skilled in the art.

Turning to FIG. 10, a schematic diagram of a power convertor circuit is shown. In the current embodiment, the power convertor circuit 30 is in a Cuk configuration. The implementation shown is a standard Cuk topology well known to those skilled in the art of DC to DC converters. The DC bus positive 82 and DC bus negative 84, output from the PFC circuit 26 provide a variable DC input voltage to the power converter circuit 30. A control input 110, from the impedance control port 53 operates a power switch 112 to control the power transfer in the overall circuit 10. An input inductor 114, an energy transfer capacitor 116, an output inductor 118, and an output capacitor 120 provide energy storage elements which are used to transform the input voltage levels to those required to drive the light emitting circuit 34 connected to the output of the power converter circuit 30. Rectifier 122 assists in controlling the flow of current during operation of the circuit 10. An input current sense resistor 124 provides an output voltage between an input current sense positive 126 and an input current sense negative 128 that is proportional to the input current to the power converter circuit 30. The input current sense resistor 124 provides the functionality of the input current sensor 36 shown in FIG. 1. An output current sense resistor 130 provides an output voltage between an output current sense positive 132 and output current sense negative 134 that is proportional to the output current of the power converter circuit 30. The output current sense resistor 130 provides the functionality of the output current sensor 40 shown in FIG. 1. The output voltage to drive the light emitting circuit 34 appears across an output positive 136 and an output negative 138. The power switch 112 can take the form of many physical devices well known in the art such as, but not limited to, BJTs, MOSFETs, and IGBTs. The rectifier 122 can also take the form of many physical devices well known in the art such as, but not limited to, diodes and tube rectifiers.

When power is first applied to the converter, the power switch is open and the energy transfer capacitor is initially charged by current flowing from the DC bus positive 82 through the input inductor 114, through the energy transfer capacitor 116 through rectifier 122, through the input current sense resistor 124 to the DC bus negative 84. Operation then begins with an input current ramp up cycle in which power switch 112 is closed by a signal from the control input 110 and rectifier 122 is off due to the reverse voltage bias across it from the energy transfer capacitor 116. This causes current to flow from the DC bus positive 82, through the input inductor 114, through the power switch 112, through the input current sense resistor 124, and back to the DC bus negative 84. This causes the input current to increase as energy is stored in the input inductor. At the same time, the charge on the energy transfer capacitor 116 flows through the power switch 112, through the output current sense resistor 130 to the output positive 136, through the light emitting circuit 34, to the output negative 138, and through the output inductor 118 back to the energy transfer capacitor 116. This causes the output current to increase as energy from the energy transfer capacitor 116 is transferred to the output inductor 118 and the light emitting circuit 34 and causes the voltage across the energy transfer capacitor 116 to drop. At the same time a fraction of the current also flows through output capacitor 120 and charges it up to a voltage level approaching the voltage across the light emitting circuit 34. This continues until the control input 110 turns off the power switch 112 and starts the input current ramp down cycle in which the rectifier 122 is on due to the forward bias voltage provided by the voltage across the DC bus positive 82 and the DC bus negative 84 and the voltages across the input inductor 114 and the energy transfer capacitor 116. This causes the input current to decrease as energy from the input inductor 114 is transferred to the energy transfer capacitor 116 and causes the voltage across the energy transfer capacitor 116 to increase.

At the same time, the output inductor 118 attempts to maintain the output current level by releasing its stored energy causing current to continue to flow through rectifier 122, through output current sense resistor 130 to the output positive 136, through the light emitting circuit 34 to the output negative 138 and back to the output inductor 118. This causes the output current to decrease. At the same time, the output capacitor 120 helps to supply some of the current to the light emitting circuit 34 and its voltage decreases. The voltage produced by the output inductor 118 will automatically adjust to a level such that the appropriate current flows in the light emitting circuit. In this way, the energy coming into the input of the power converter circuit 30 is transferred to the light emitting circuit 34 albeit at the required voltage level of the light emitting circuit. The control input 110 then turns on the power switch 112 ending the cycle and the process repeats again with the input current ramp up cycle. The duty cycle at which the control input signal 110 operates the power switch 112 determines the average input current and subsequently, the amount of power delivered to the output. With respect to the Cuk topology, the input inductor 114 and output inductor 118 can be coupled by winding them onto a single transformer. Although not required when input current control is used, such as in this application, a compensation circuit comprising a capacitor in series with a resistor can be placed across the energy transfer capacitor 116 to improve the response and stability of the system. The input current sense resistor 124 and the output current sense resistor 130 can be replaced with other devices known to those skilled in the art such as, but not limited to, hall effect sensors. The Cuk converter topology as shown in FIG. 10 is also known to those skilled in the art as a boost-buck converter. There are also other possible DC to DC converter configurations known to those skilled in the art that may be used in place of a Cuk converter topology. These include, but are not limited to, buck-boost converters, buck converters, and boost converters. The salient features of the converter used are that the input current is controlled and the output voltage adjusts such that the energy drawn at the input is transferred to the light emitting circuit on the output.

Figure 11:
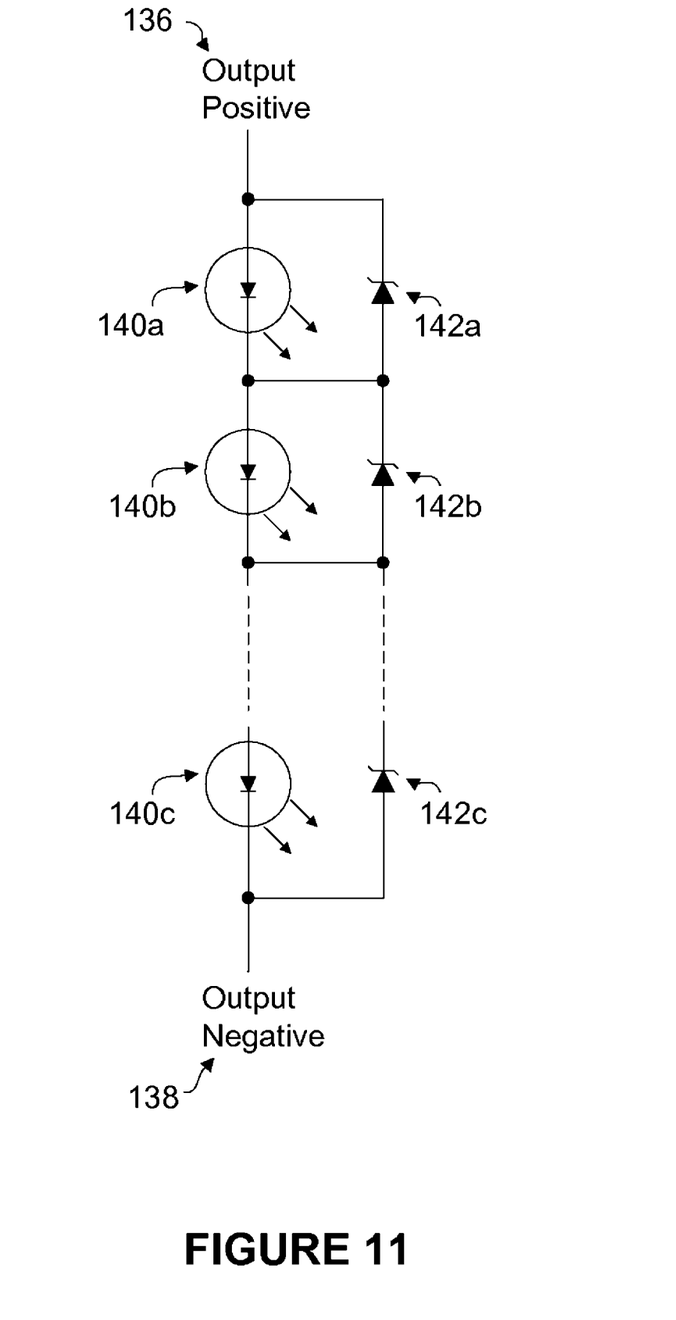
FIG. 11 is an electrical schematic of a light emitting circuit configured as a single string.

Turning to FIG. 11, a schematic diagram of an embodiment of a light emitting circuit 34 is shown. The implementation shown in FIG. 11 shows a single string of light emitting diodes, or devices, 140a, 140b, 140c between the output positive 136 and the output negative 138. Although only three are shown, any number of light emitting devices can be used. Each light emitting device 140 is shown bypassed with an optional zener diode 142a, 142b, 142c for robustness. The zener diodes 142 preferably have a zener knee slightly larger than the forward voltage of the light emitting devices so that if any of the light emitting devices 140a, 140b, 140c become defective the corresponding zener diode bypasses the light emitting device and keeps the rest of the string functional. The light emitting devices 140a, 140b, 140c and others are typically LEDs but may be any device that can operate from a DC voltage and current. The zener diodes 142a, 142b, 142c can be replaced by any device that conducts current when a certain voltage across it is exceeded. Examples of other such devices are, but not limited to, transient voltage suppressors, metal oxide varistors, diacs, and composite circuits such as those composed of SCRs that are well known to those skilled in the art. The circuit in FIG. 11 can have one or more light emitting devices. The zener diodes need not bypass only one light emitting device. A zener diode (or other similar device) with an appropriate forward voltage may bypass multiple light emitting devices.

Figure 12:
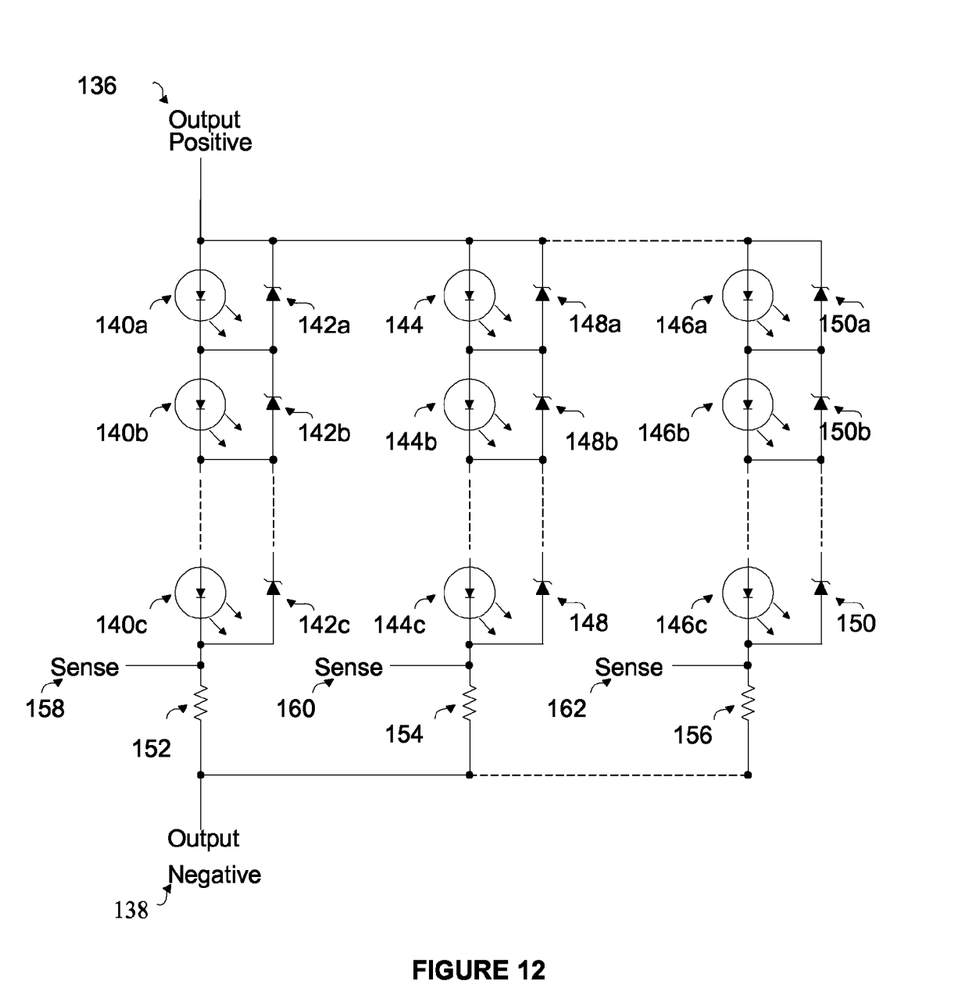
FIG. 12 is an electrical schematic of a light emitting circuit configured as multiple strings.

FIG. 12 of the drawings shows an alternative configuration for the light emitting circuit 34. In the current figure, the light emitting circuit 34 shown in FIG. 11 is duplicated into multiple parallel strings and each string has a load balance resistor 152, 154, 156 added between the last light emitting device 140c, 144c, 146c and the output negative 138 for current balancing. The load balance resistors 152, 154, 156 can also be used to sense current in the individual strings at points 158, 160, 162. The load balancing resistors can be replaced with other components or circuits that balance the current among the multiple strings. The current sensing outputs 158, 160, 162 can be provided through other devices known to those skilled in the art such as, but not limited to, hall effect current sensors or separate current sensing resistors.

As disclosed above, the third function of the control circuit 32 is to monitor the current through multiple strings of light emitting devices by way of their current sense outputs. In relation to FIG. 12, the current sensor 42 corresponds to the current sense signals 158, 160, 162.

In operation, signals are transmitted to the connections 12a, 12b, 14a and 14b from a lamp ballast or a line voltage source which are then transmitted through the circuit 10. The voltages from all the connections are transmitted to the AC overvoltage protection circuit 20 and the connections 12a and 12b from the first connector 12 are transmitted to a first filament control 16 and the connections 14a and 14b from the second connector 14 are transmitted to a second filament control 18. The AC overvoltage protection circuit 20 provides protection to the circuit 10 so that transient voltages are suppressed and do not negatively affect operation of the circuit 10. As will be understood, if the input is a DC signal, there is no need to transmit the inputs to the AC overvoltage protection circuit 20.

The two filament controls 16 and 18 are controlled by a filament control signal from the control circuit 32 to control the impedance between the two connections to which the filament control 16 or 18 is associated.

The output of the connections 12a, 12b, 14a and 14b are also connected as inputs to the rectifier circuit 22 which transmits the inputs through rectifier devices 68 to produce the rectifier DC positive output 72 and the DC negative output 70. The DC positive output 72 and DC negative output 70 are then transmitted through the DC overvoltage protection circuit 24 to provide further protection to the circuit 10 so that transient voltages from the DC positive and DC negative outputs 72 and 70 would not negatively affect operation of the circuit.

The DC positive output 72 and the DC negative output 70 are then transmitted to the PFC circuit 26 where the signals are transmitted through the PFC circuit 26 to produce the DC Bus positive output 82 and the DC Bus negative output 84.

These two outputs 82 and 84 are then transmitted to the power converter circuit 30 and to the V+ and V− input ports 50 and 52 of the control circuit 32. The control circuit receives the outputs 82 and 84 along with a signal from the input current sensor 36. Using these signals, the control circuit 32 monitors the DC bus voltage at the input to the power converter 30 at connection point 28 where the voltage difference between DC bus positive 82 and DC bus negative 84 is measured.

The control circuit 32 also monitors the power converter 30 input current shown at current sense 36 by monitoring the voltage drop across input current sense resistor 124 of the power converter 30 between input current sense positive 126 and input current sense negative 128. The desired current level is calculated by dividing the DC bus voltage by the desired input impedance and a hysteresis band with an upper and lower limit is calculated from this value.

The control circuit 32 then turns on the power switch 112 in the power converter 30 until the monitored input current reaches the upper hysteresis limit. The control circuit 32 then turns off the power switch 112 in the power converter 30 until the monitored input current reaches the lower hysteresis limit and the cycle repeats. In this way the average input impedance of the power converter 30 is controlled.

After receiving the outputs 82 and 84, seen as a variable DC input voltage, from the PFC circuit 26 and a control signal from the impedance control port 53, the power convertor circuit 30 operates the power switch 112 in response to the control signal to control the power transfer in the circuit 30. The input inductor 114, the energy transfer capacitor 116, the output inductor 118, and the output capacitor 120 provide the energy storage elements needed to transform the input voltage levels to those required to drive the light emitting circuit 34 which is connected to the output of the power converter circuit 30 while rectifier 122 helps to control the flow of current during operation. The input current sense resistor 124 provides an output voltage between the input current sense positive 126 and input current sense negative 128 that is proportional to the input current to the power converter circuit 30 (also seen as the input current sensor 36 shown). The output current sense resistor 130 provides an output voltage between the output current sense positive 132 and output current sense negative 134 that is proportional to the output current of the power converter circuit 30 (also seen as the output at output current sensor 40 shown in FIG. 1). The output voltage to drive the light emitting circuit 34 appears across the output positive 136 and the output negative 138. When power is first applied to the power converter circuit 30, the power switch 112 is open and the energy transfer capacitor 116 is initially charged by current flowing from the DC bus positive 82 through the input inductor 114, through the energy transfer capacitor 116, rectifier 122, the input current sense resistor 124 to the DC bus negative 84.

Operation then begins with an input current ramp up cycle in which the power switch 112 is closed by the signal from the control input 110 and rectifier 122 is turned off due to the reverse voltage bias across it from the energy transfer capacitor 116 causing current to flow from the DC bus positive 82 to the DC bus negative 84 through the input inductor 114, power switch 112 and input current sense resistor 124. This also causes the input current to increase as energy is stored in the input inductor 114. At the same time, the charge on the energy transfer capacitor 116 flows through the power switch 112, the output current sense resistor 130 and the output positive 136, through the light emitting circuit 34, to the output negative 138, and through the output inductor 118 back to the energy transfer capacitor 116. This causes the output current to increase as energy from the energy transfer capacitor 116 is transferred to the output inductor 118 and the light emitting circuit 34 and causes the voltage across the energy transfer capacitor 116 to drop. At the same time a fraction of the current also flows through output capacitor 120 and charges it up to a voltage level approaching the voltage across the light emitting circuit 34. This continues until the control input 110 turns off the power switch 112 and starts the input current ramp down cycle in which the rectifier 122 is on due to the forward bias voltage provided by the voltage across the DC bus positive 82 and the DC bus negative 84 and the voltages across the input inductor 114 and the energy transfer capacitor 116. This causes the input current to decrease as energy from the input inductor 114 is transferred to the energy transfer capacitor 116 and causes the voltage across the energy transfer capacitor 116 to increase. At the same time, the output inductor 118 attempts to maintain the output current level by releasing its stored energy causing current to continue to flow through rectifier 122, through output current sense resistor 124 to the output positive 136, through the light emitting circuit 34 to the output negative 138 and back to the output inductor 118. This causes the output current to decrease.

At the same time, the output capacitor 120 helps to supply some of the current to the light emitting circuit 34 and its voltage decreases. The voltage produced by the output inductor 118 will automatically adjust to a level such that the appropriate current flows in the light emitting circuit. In this way, the energy coming into the input of the power converter circuit 30 is transferred to the light emitting circuit 34 albeit at the required voltage level of the light emitting circuit. The control input 110 then turns on the power switch 112 ending the cycle and the process repeats again with the input current ramp up cycle. The duty cycle at which the control input signal 110 operates the power switch 112 determines what the average input current is and subsequently, how much power is delivered to the output.

After the signals have passed through the power converter circuit 30, the output positive 136 and the output negative 138 are transmitted to the light emitting circuit 34 to control operation of the lights within the circuit 34.

The output positive signal 136 is then transmitted to the light emitting devices 140, or the light emitting device 140 is bypassed by the corresponding zener diode 142 to provide the necessary power to the devices 140 for operation.

During operation of the circuit, the control circuit 32 also monitors the DC bus voltage at the output of the power converter 30 shown at connection point 36 where the voltage difference between output positive 138 and output negative 136 is measured. The control circuit 32 also monitors the power converter 30 output current shown with the current sense 40 by monitoring the voltage drop across output current sense resistor 130 between output current sense positive 132 and output current sense negative 134. If an overvoltage or overcurrent condition is detected then the control circuit 32 either can command the filament simulation circuits 16 and 18 through their filament control inputs to become high impedance to cause the ballast to shut down or attempt to change the input impedance of the power converter circuit 30 by changing the controlled impedance set point in order to reduce the operating output power point of the ballast. If an undervoltage or undercurrent condition is detected then the control circuit 32 can attempt to change the input impedance of the power converter circuit 30 by changing the controlled impedance set point in order to increase the operating output power point of the ballast.

In the case of multiple light emitting device strings as shown in FIG. 12, the control circuit 12 monitors the current sense outputs 158, 160 and 162 of the light emitting circuit 34. A drop in current from a light emitting device string indicates it has failed and in such a case the control circuit attempts to reduce the power drawn by the input of the power converter circuit 30 so that the remaining light emitting device strings will not see an increase in current through them and thus prevent them from being damaged. The control circuit 32 attempts to change the input impedance of the power converter circuit 30 by changing the controlled impedance set point in order to reduce the operating output power point of the ballast. As described above with respect to the single string of LEDs, the control circuit 32 can also be designed to shut down the ballast by sending filament control commands to the filament simulation circuits 16 and 18 through the filament control signal to become high impedance.

The control circuit 32 can also monitor communication inputs from external devices through its communications input 44a. When a command is received to dim to a certain level the control circuit 32 changes the input impedance of the power converter circuit 30 by changing the controlled impedance set point (via the control signal 110) in order to change the operating output power point of the ballast. When a command is received to turn off the lamp the control circuit 32 shuts down the ballast by sending filament control commands to the filament simulation circuits 16 and 18 through their filament control inputs to become high impedance and set the ballast into fault mode. Other commands may also be received and processed by the control circuit 32. The control circuit 32 can log and report back operation of the unit to external devices through its communications output 44b. The status of the unit as well as logs may be communicated to external devices through these outputs.

In an alternative embodiment, if the power being supplied to the connectors is a DC signal, there is no need for a rectifier 22 or an AC overvoltage protection circuit 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An impedance controlled electronic lamp circuit, powered by a power source, for controlling a set of light emitting devices and being, comprising:
    at least one connector, for connecting to the power source; and for receiving a power signal;
    at least one filament control, associated with one of the at least one connector;
    a power convertor circuit; for receiving the power signal and for processing the power signal to provide a signal to power to the set of light emitting devices; and
    a control and monitoring circuit, including:
        an input current port;
        an input voltage plus (V+) port;
        an input voltage minus (V−) port;
        an output current port;
        an output voltage plus (V+) port; and
        an output voltage minus (V−) port;
    wherein the control and monitoring circuit monitors the power signal and controls the impedance of either the at least one filament control or the power convertor circuit to control the set of light emitting devices.

2. An impedance controlled electronic lamp circuit of claim 1 wherein the power signal is an AC signal.

3. An impedance controlled electronic lamp circuit of claim 2 further comprising:
    an AC overvoltage protection circuit, connected to the first and second ballast connections of the first and second connector.

4. An impedance controlled electronic lamp circuit of claim 2 further comprising a circuit for transforming the AC signal to a DC signal.

5. An impedance controlled electronic lamp circuit of claim 4 wherein the circuit for transforming the AC signal to a DC signal is a rectifier circuit.

6. An impedance controlled electronic lamp circuit of claim 5 further comprising a DC overvoltage protection circuit connected to an output of the rectifier circuit.

7. An impedance controlled electronic lamp circuit of claim 6 further comprising:
    a power factor conditioning circuit, connected to an output of the rectifier circuit.

8. An impedance controlled electronic lamp circuit of claim 1 wherein the power signal is a DC signal.

9. An impedance controlled electronic lamp circuit of claim 1 further comprising:
    a first connector, having a first power source connection and a second power source connection; and
    a second connector, having a first power source connection and a second power source connection.

10. An impedance controlled electronic lamp circuit of claim 9 wherein the first power source connection and the second power source connection of the first connector are a first ballast connection and a second ballast connection and the first power source connection and the second power source connection of the second connector are a first ballast connection and a second ballast connection.

11. An impedance controlled electronic lamp circuit of claim 1 wherein the control and monitoring circuit comprises:
    a filament control output port, connected to the at least one filament control to control the at least one filament control; and
    an impedance control output port, connected to the power convertor circuit to control the power convertor circuit.

12. An impedance controlled electronic lamp circuit of claim 1 wherein the power source is a lamp ballast of a line voltage source.

13. An impedance controlled electronic lamp circuit of claim 12 wherein the line voltage source is a main power line supplying nominal rated 120V, 230V, 240V, 277 V or 347V line voltage.

14. An impedance controlled electronic lamp circuit of claim 1 wherein the control and monitoring circuit further comprises:
    a feedback port.

15. An impedance controlled electronic lamp circuit of claim 14 wherein the control and monitoring circuit further comprises:
    an external device communications input port; and
    an external device communication output port.

16. An impedance controlled electronic lamp circuit as in claim 1, wherein the lamp ballast controls a fluorescent lamp.

17. An impedance controlled electronic lamp circuit as in claim 1, wherein the lamp ballast controls a High Intensity Discharge (HID) lamp.

18. An impedance controlled electronic lamp circuit as in claim 1, wherein an external control signal, obtained though either direct connection to the electronic lamp's connector pins, or through indirect connection via optical, inductive or Radio Frequency interface, is used to control the electronic light emitting devices.

* * * * *